(12) United States Patent
Krounbi et al.

(10) Patent No.: US 6,722,019 B1
(45) Date of Patent: Apr. 20, 2004

(54) METHOD OF MAKING HORIZONTAL THIN FILM WRITE, MR READ HEAD

(75) Inventors: Mohamad Towfik Krounbi, San Jose, CA (US); Mark E. Re, Los Gatos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 09/044,268

(22) Filed: Mar. 19, 1998

Related U.S. Application Data

(62) Division of application No. 08/856,532, filed on May 14, 1997, now Pat. No. 5,768,070.

(51) Int. Cl.⁷ .................................................. G11B 5/42
(52) U.S. Cl. ........................ 29/603.14; 29/603.07; 29/603.23; 360/313; 360/320
(58) Field of Search .......................... 29/603.1, 603.12, 29/603.07, 603.23, 603.14; 360/113, 119, 126, 313, 314, 320

(56) References Cited

U.S. PATENT DOCUMENTS

| | | | |
|---|---|---|---|
| 4,277,809 A | 7/1981 | Fisher et al. | 360/131 |
| 4,432,028 A | 2/1984 | Desserre et al. | 360/113 |
| 4,438,470 A | 3/1984 | Sawada et al. | 360/113 |
| 4,555,740 A | 11/1985 | Jackson et al. | 360/113 |
| 4,639,289 A | 1/1987 | Lazzari | 156/643 |
| 4,703,378 A | 10/1987 | Imakoshi et al. | 360/113 |
| 4,731,157 A | 3/1988 | Lazzari | 156/643 |
| 4,782,415 A | 11/1988 | Vinal | 360/113 |
| 4,809,103 A | 2/1989 | Lazzari | 360/103 |
| 4,837,924 A | 6/1989 | Lazzari | 29/603 |
| 4,843,505 A | 6/1989 | Mowry | 360/113 |
| 4,881,143 A | 11/1989 | Bhattacharyya et al. | 360/113 |
| 4,901,177 A | 2/1990 | Lazzari | 360/113 |
| 4,922,360 A | 5/1990 | Takano et al. | 360/113 |
| 4,949,207 A | 8/1990 | Lazzari | 360/119 |
| 4,967,298 A | 10/1990 | Mowry | 360/113 |
| 4,984,118 A | 1/1991 | Springer | 360/125 |
| 4,987,509 A | 1/1991 | Gill et al. | 360/113 |
| 5,025,341 A | 6/1991 | Bousquet et al. | 360/120 |
| 5,081,554 A | 1/1992 | Das | 360/113 |
| 5,136,775 A | 8/1992 | Onoe et al. | 29/603 |
| 5,159,511 A | 10/1992 | Das | 360/113 |
| 5,196,976 A | 3/1993 | Lazzari | 360/113 |
| 5,274,521 A | 12/1993 | Miyauchi et al. | 360/119 |
| 5,408,373 A | 4/1995 | Bajorek et al. | 360/104 |
| 5,438,747 A | 8/1995 | Krounbi et al. | 29/603 |
| 5,452,164 A | 9/1995 | Cole et al. | 360/113 |
| 5,479,696 A | 1/1996 | McNeil | 29/603 |
| 5,568,335 A | * 10/1996 | Fontana et al. | 360/320 |

FOREIGN PATENT DOCUMENTS

JP          11-213343        *  8/1999

* cited by examiner

*Primary Examiner*—A. Dexter Tugbang
(74) *Attorney, Agent, or Firm*—Ervin F. Johnston; Baker, Maxham, Jester & Meador

(57) ABSTRACT

A horizontal combined head is provided which has both a thin film write and an MR read element located at an air bearing surface (ABS). The read element can be formed with a track width that is independent of the track width of the write element. The MR sensor or the read element is separated from one of the first and second pole pieces of the write element by an insulation layer. Accordingly, the shields for the read element remain more stable after a write operation. In one embodiment of the present invention a single stripe MR sensor is employed while in a second embodiment a dual stripe MR sensor is employed. A method of the invention includes forming the dual MR stripe in a single process step so that the dual MR stripes of the dual MR sensor are near identical for implementing near absolute common mode rejection of noise.

13 Claims, 17 Drawing Sheets

METHOD OF MAKING HORIZONTAL THIN FILM WRITE, MR READ HEAD

REFERENCE TO RELATED APPLICATION

This application is a divisional application of application Ser. No. 08/856,532 filed May 14, 1997, U.S. Pat. No. 5,768,070.

BACKGROUND OF THE INVENTION

1. Field of the Invention

The present invention relates to a horizontal head with combined thin film write and MR (magnetoresistive) read elements at an air bearing surface (ABS) and more particularly to a merged or piggyback horizontal head wherein an MR sensor employs one or two MR stripes, the two MR stripes being uniquely formed for improved common mode rejection.

2. Description of the Related Art

A typical combined head includes a thin film inductive write element and a magnetoresistive (MR) read head. The thin film inductive write element includes one or more coil layers embedded in an insulation stack, the insulation stack being sandwiched between first and second pole piece layers that extend into a pole tip region. A gap layer forms a write gap between the pole pieces in the pole tip region. The pole pieces are magnetically coupled across a back gap in a back gap region. Between the pole tip region and the back gap region lies a yoke region where the pole piece layers separate from one another to accommodate the insulation stack. The insulation stack typically includes a first insulation layer (I1) on the first pole piece layer, one or more coil layers on the first insulation layer, a second insulation layer (I2) over the coil layer and a third insulation layer (I3) over the second insulation layer.

An MR read head includes an MR sensor sandwiched between first and second gap layers which are, in turn, sandwiched between first and second shield layers. The MR sensor may be an anisotropic magnetoresistive (AMR) sensor or a spin valve sensor. In a merged head a single layer serves both as a second shield layer for the read head and as a first pole piece for the write head. In a piggyback MR head the second shield layer and the first pole piece are separate layers. The merged (or piggyback) head is carried on a slider which, in turn, is mounted on a suspension in a magnetic disk drive. The suspension is mounted to an actuator which moves the head over selected tracks on a rotating disk for reading and writing signals thereon. Rotation of the disk creates a cushion of air that serves as an air bearing between the disk and the slider that counterbalances a loading force exerted by the suspension. A surface of the slider facing the disk is called an air bearing surface (ABS). The ABS is typically spaced from the disk in the order of 0.050 $\mu$m when the disk is rotating.

A combined head (that is, a merged or a piggyback head) may be a "vertical" head or a "horizontal" head. In a vertical head a major plane of the first pole piece layer is generally perpendicular to the ABS, with edges of the first and second pole piece layers exposed at the ABS. In a typical horizontal head horizontal components of the first and second pole piece layers form a portion of the ABS so that edges of these layers are generally perpendicular to the ABS and extend internally into the head without being exposed at the ABS. In a horizontal head an insulation or gap layer separates the edges of the first and second pole piece layers at the ABS.

In the vertical head, the MR sensor for the read element is located at the ABS. In the horizontal head the edge of the MR sensor for the read head is typically recessed from the ABS and receives read signals via one of the pole piece layers which serves as a flux guide. Accordingly, the MR sensor, the first and second shields and the first and second pole pieces are all in series. There are several problems with this arrangement. First, it is desirable that the trace of a track being read be narrower than the track as written. This is impossible with the prior art arrangement since the write gap also serves as the read gap. Next, each time a write operation is performed the shields are subjected to a high density of flux, which can render them unstable. As a result of instability, the magnetic domains of shield layers may not return to their initial state, which can change the bias point of the MR sensor and result in inaccurate playback.

In both the vertical and horizontal heads it is desirable to increase the signal-to-noise ratio during readback. This can be accomplished by employing a dual stripe MR sensor wherein each MR stripe conducts an identical sense current. During operation, both sense currents may be conducted to a differential amplifier in order to implement common mode noise rejection. If the read head collides with an asperity on a magnetic disk, noise generated by this collision will be reduced by common mode rejection. However, it is difficult to obtain near absolute common mode rejection because the MR stripes are typically formed in separate process steps. When MR stripes are formed in separate process steps they are not identical, due to slight differences in temperature, pressure, atmosphere and process times. In a dual stripe, vertical MR head, the thin film layers of the read element are sequentially formed by separate process steps. Thus, there is a need to form the two stripes of an MR element in a single process step so that the two stripes are substantially identical, the better to implement near-absolute common mode rejection of noise.

SUMMARY OF THE INVENTION

The present invention provides a horizontal combined head which has read and write heads located at the ABS. The read head is embodied with an MR sensor. The write head is embodied with first and second pole pieces separated by a write gap. An edge of the MR sensor as well as the write gap are located at the ABS. This is accomplished by insulating the MR sensor from the first pole piece and spacing the MR sensor from the write gap along the plane of the ABS. With this arrangement the track width of the read element may be less than the track width of the write head.

The present invention also provides a horizontal combined head including a dual stripe MR sensor, wherein a pair of MR stripes are formed in a single process step. This is accomplished by constructing an elongated pedestal, depositing a layer of MR material on the sides and top of the pedestal, and then milling the MR material from the top of the pedestal, leaving an MR stripe on each side of the pedestal. The two MR stripes are substantially identical, thereby promoting near absolute common mode rejection of noise. The MR sensor may be an AMR sensor or a spin valve sensor.

An object of the present invention is to provide a horizontal head which has both of its read and write heads located at the ABS.

Another object is to provide a dual stripe MR sensor wherein the pair of MR stripes are nearly identical to promote near absolute common mode rejection of noise.

A further object is to provide a method of making a horizontal head with combined read and write elements at the ABS.

Yet another object is to provide a method of making a dual stripe MR sensor wherein the pair of MR stripes are formed in the same process step.

Other objects and many of the advantages of the invention will become apparent upon reading the following description of the invention taken together with the accompanying drawings.

DESCRIPTION OF THE PREFERRED EMBODIMENTS

Figure 1:
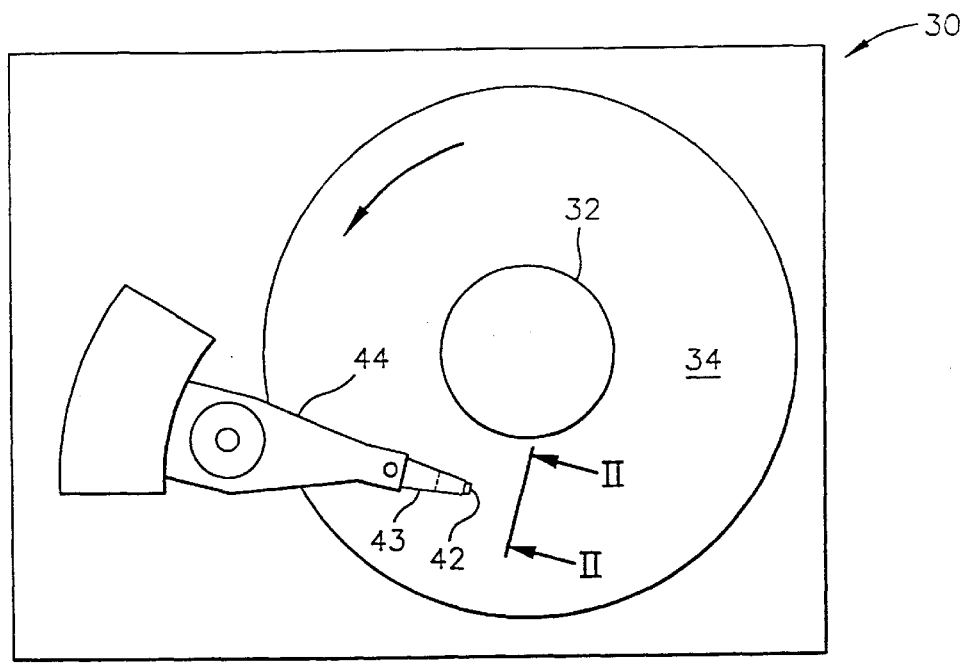
FIG. 1 is a planar view of an exemplary magnetic disk drive which may employ the horizontal magnetic head of the present invention.
Figure 2:
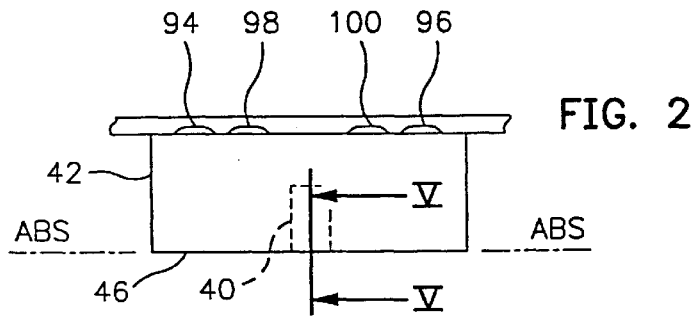
FIG. 2 is an end view of a slider with the present magnetic head as seen in plane II—II of FIG. 1.
Figure 3:
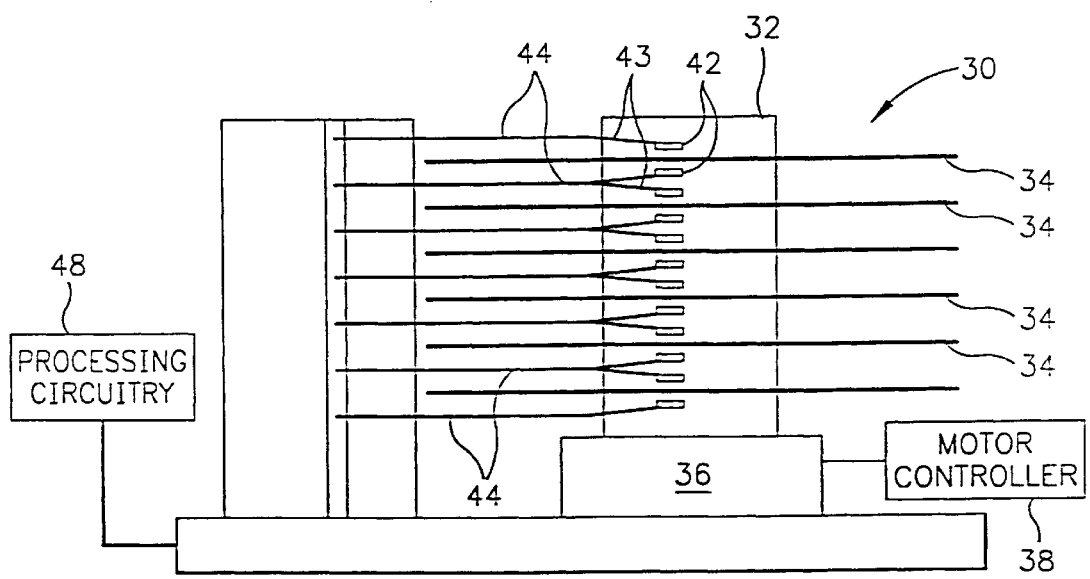
FIG. 3 is an elevation view of the magnetic disk drive wherein multiple disks and magnetic heads are employed.
Figure 4:
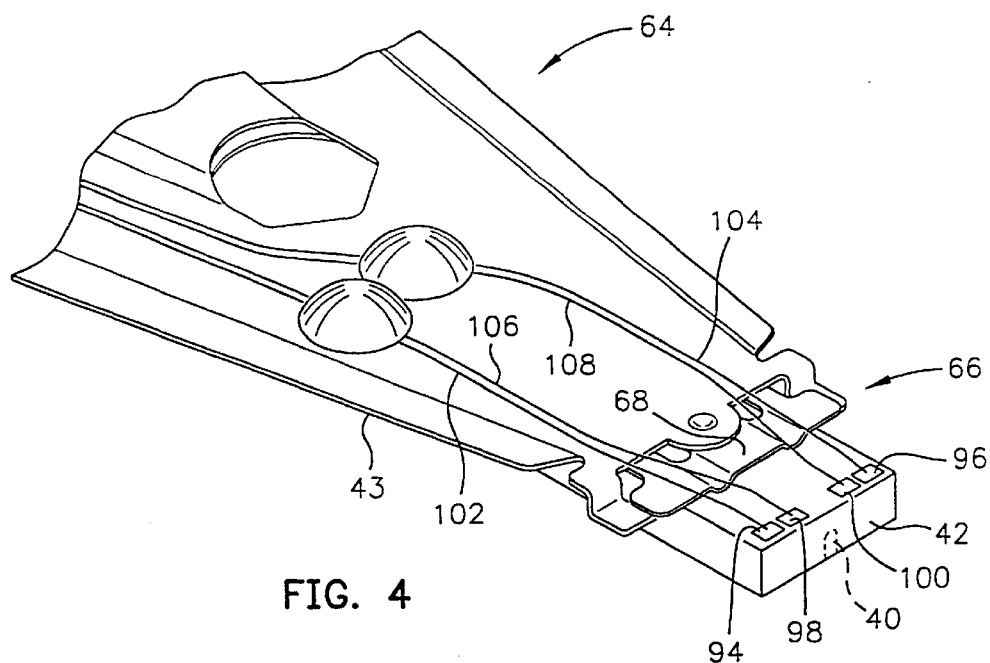
FIG. 4 is an isometric illustration of an exemplary suspension system for supporting the slider and the present magnetic head.

Referring now to the drawings wherein like reference numerals designate like or similar parts throughout the several views there is illustrated in FIGS. 1–3 a magnetic disk drive 30. The drive 30 includes a spindle 32 which supports and rotates a magnetic disk 34. The spindle 32 is rotated by a motor 36 which in turn is controlled by a motor controller 38. A horizontal combined magnetic head 40 for reading and recording is mounted on a slider 42 which, in turn, is supported by a suspension 43 and actuator arm 44. A plurality of disks, sliders and suspensions may be employed in a large capacity direct access storage device (DASD) as shown in FIG. 3. The suspension 43 and actuator arm 44 position the slider 42 to place the magnetic head 40 in a transducing relationship with a surface of the magnetic disk 34. When the disk 34 is rotated by the motor 36 the slider is supported on a thin (typically, 0.05 μm) cushion of air (air bearing) by the air bearing surface (ABS) 46. The magnetic head 40 may then be employed for writing information to multiple circular tracks on the surface of the disk 44, as well as for reading information therefrom. Processing circuitry 48 exchanges signals representing such information with the head 40, provides motor drive signals, and also provides control signals for moving the slider to various tracks. In FIG. 4 the slider 42 is shown mounted to a head gimbal assembly (HGA) 50 which in turn is mounted to the suspension 43.

Figure 5:
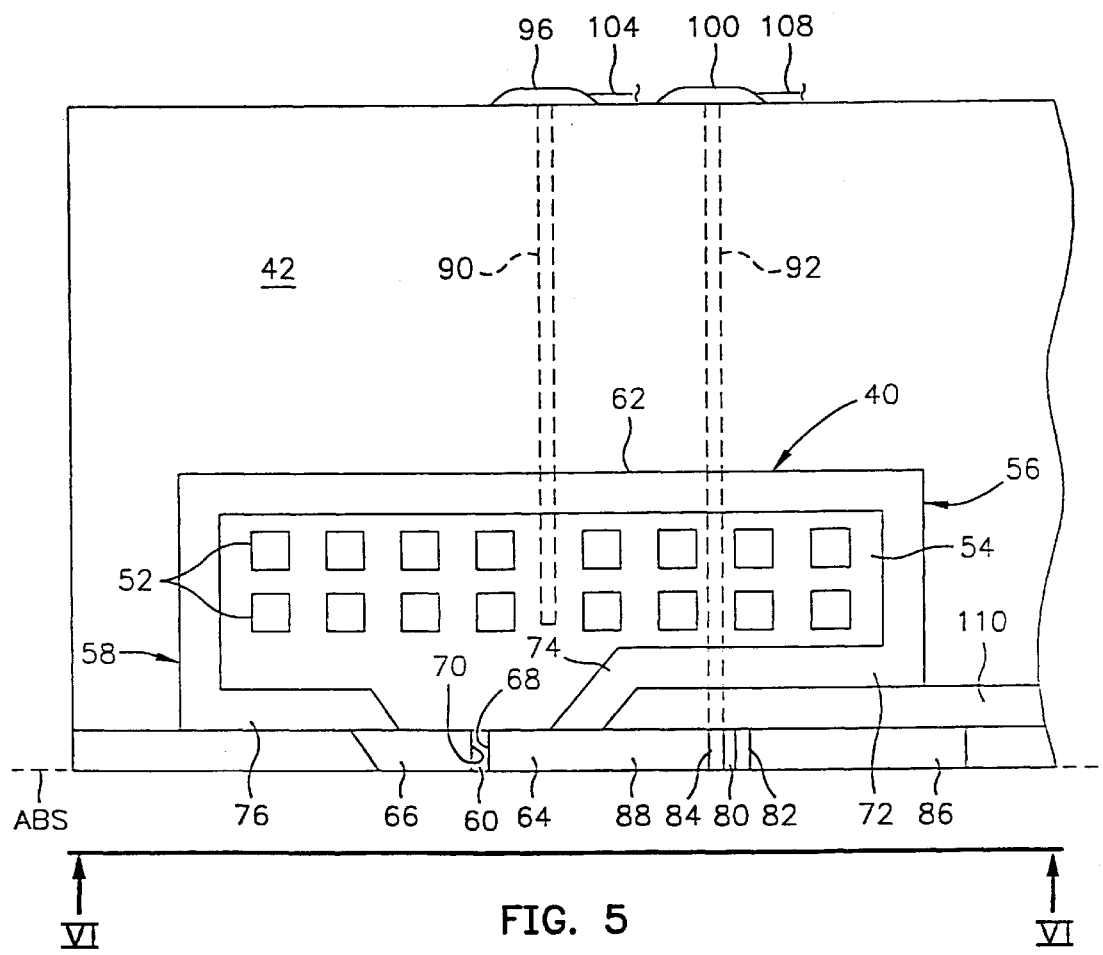
FIG. 5 is a partial view of the slider and the present magnetic head as seen in plane V—V of FIG. 2.
Figure 6:
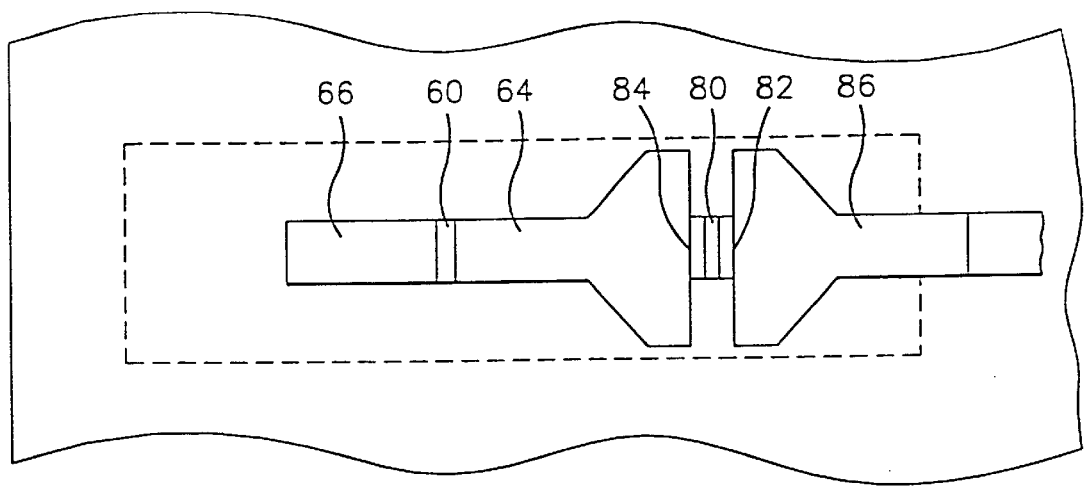
FIG. 6 is a view seen in plane VI—VI of FIG. 5.

The horizontal head 40 is shown embedded in the slider 42 in FIGS. 5 and 6. The horizontal head 40 includes one or more coil layers 52 which are embedded in an insulation stack 54. The insulation stack 54 is surrounded by and sandwiched between first and second pole pieces 56 and 58, the pole pieces 56 and 58 being separated by an insulative gap layer 60 at the ABS and being connected at a back gap region 62. Accordingly, when a current is conducted through the coil layers 52 flux will fringe between the first and second pole pieces across the gap 60 to write signals into the magnetic disk 34 (FIG. 1).

The first pole piece 56 has a horizontal component 64 and the second pole piece 58 has a horizontal component 66. The horizontal components 64 and 66 are thin film layers which have major planar thin film surfaces which form a part of the ABS and which have edges 68 and 70 which are substantially perpendicular to the ABS and are thicknesses between the major planar thin film surfaces. As can be seen from FIGS. 5 and 6 the major planar surfaces of the horizontal components 64 and 66 are much larger in area than the areas of the edges 68 and 70 therebetween. This structure distinguishes the horizontal head 40 from a vertical head (not shown) which has thin film edges of the first arid second pole pieces forming a portion of the ABS and major thin film planar surfaces of the first and second pole pieces extending substantially perpendicular to the ABS. Horizontal and vertical magnetic heads should not be confused with horizontal and vertical recording in the magnetic media. Vertical recording means that the signals in the magnetic media are polarized perpendicular to the surface of the media whereas in horizontal recording the polarization of the signals is parallel to the surface of the media. The first pole piece 56 has a recessed horizontal component 72 which is connected to the horizontal component 64 by a slanted component 74 and the second pole piece 58 has a recessed horizontal component 76 which is connected to the horizontal component 66.

Exposed at the ABS is an MR sensor 80 which is sandwiched between first and second gap layers 82 and 84. The MR sensor 80 may be an AMR sensor or a spin valve sensor. The first and second gap layers 82 and 84 are located between an edge surface of the first and second shield layer 86 and the first horizontal component 64. Major thin film surfaces of the first shield layer 86 and the first horizontal component 64 form a portion of the ABS. The horizontal head 40 shown in FIG. 5 is a merged MR horizontal head since the horizontal component 64 of the first pole piece 56 and serves as a second shield of the MR head. Optionally, the horizontal component 64 can be two separate layers separated by an insulation layer so that a first portion of the horizontal component 64 serves as the first pole piece and a second portion serves as a second shield for the MR sensor. This latter type of head is referred to as a piggyback MR head.

A pair of vias, one of which is shown at 90, extends through the slider 42 and the insulation stack 54 for providing a current I to the coil layers 52 and a pair of vias, one of which is shown at 92, extends through the slider 42 and the insulation stack 54 for providing a sense current $I_s$ to the MR sensor 80. The vias 90 and 92 are filled with a conductive material, such as copper, for conducting the currents. The pair of vias, including via 90, terminate at exposed pads 94 and 96 and the pair of vias, including via 92, terminate at exposed pads 98 and 100, as shown in FIGS. 4 and 5. Conductors 102 and 104 are connected to the pads 94 and 96 and conductors 106 and 108 are connected to the pads 98 and 100 at first ends thereof and second ends of the conductors (not shown) are connected to the processing circuitry 48 shown in FIG. 3.

The present invention is distinguished by an insulation layer 110 which is sandwiched between the recessed horizontal component 72 of the first pole piece 56 on one side and the MR sensor 80, the first and second gap layers 82 and 84 and the first and second shield layers 86 and 88 on the other side. This isolates the operation of the read head portion from the write head portion so that the read head portion can be located at the ABS. This obviates the problem associated with employing one of the pole pieces as a flux guide for the read head which causes instability of the shield layers as well as the problem of coupling the track width of the read head to the write head discussed hereinabove.

FIGS. 7A–7F show various steps in the construction of the horizontal combined head with emphasis on the construction of the write and read elements. In the construction of the horizontal head a substrate 112 is provided which, after construction of multiple heads thereon, is diced into individual sliders 42 with a respective horizontal head 40 carried thereby. A layer of head compatible material 114, such as silicon dioxide, may be laid on top of the substrate 112. A layer of Permalloy, or other magnetically soft material 116 is then formed on top of the layer 114, a first insulation layer 118 is formed on top of the Permalloy layer 116, the first coil layer 52 is formed on top of the first insulation layer 118, a second insulation layer 122 is formed on top of the first insulation layer 118 and the first coil layer 52, a third insulation layer 124 is formed on top of the second insulation layer and the first coil layer 120, the second coil layer 52 is formed on top of the third insulation layer 124 and a fourth insulation layer 128 is formed on top of the third insulation layer 124 and the second coil layer 52. The Permalloy layer 116 and the coil layers 52 may be formed by employing typical photolithography techniques. The layers 116, 118, 122, 124 and 128 extend laterally throughout a wide expanse of the wafer 112 and may be lapped for planarization after each formation. Vertical components 130 and 132 of the first and second pole pieces are formed in vias and joined to the Permalloy layer 116. Construction of a similar head is shown in a commonly assigned U.S. Pat. No. 5,408,373 which is incorporated by reference herein.

Figure 7A:
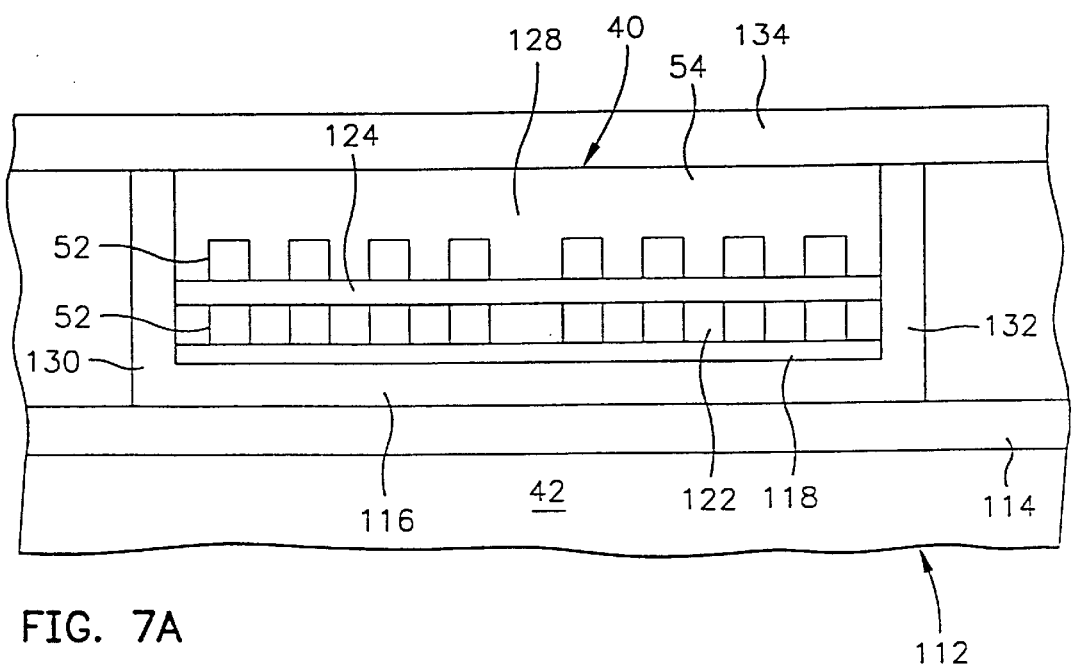
FIGS. 7A–7F are schematic cross-sectional side views illustrating various process steps employed in constructing the present horizontal magnetic head on a substrate or slider.
Figure 7B:
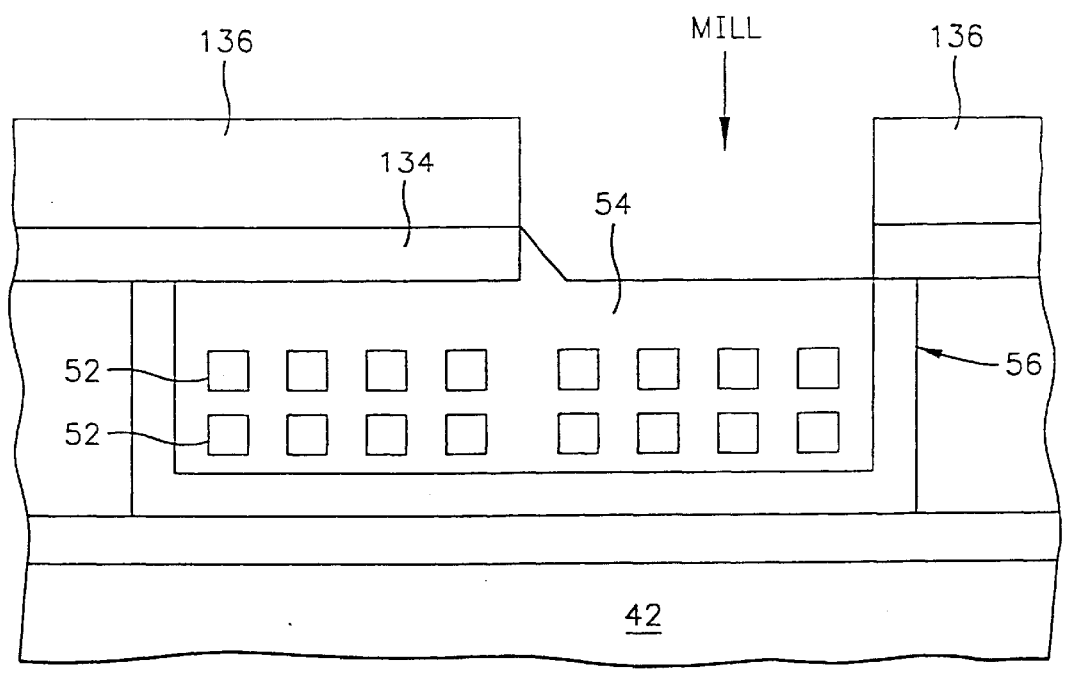
Figure 7C:
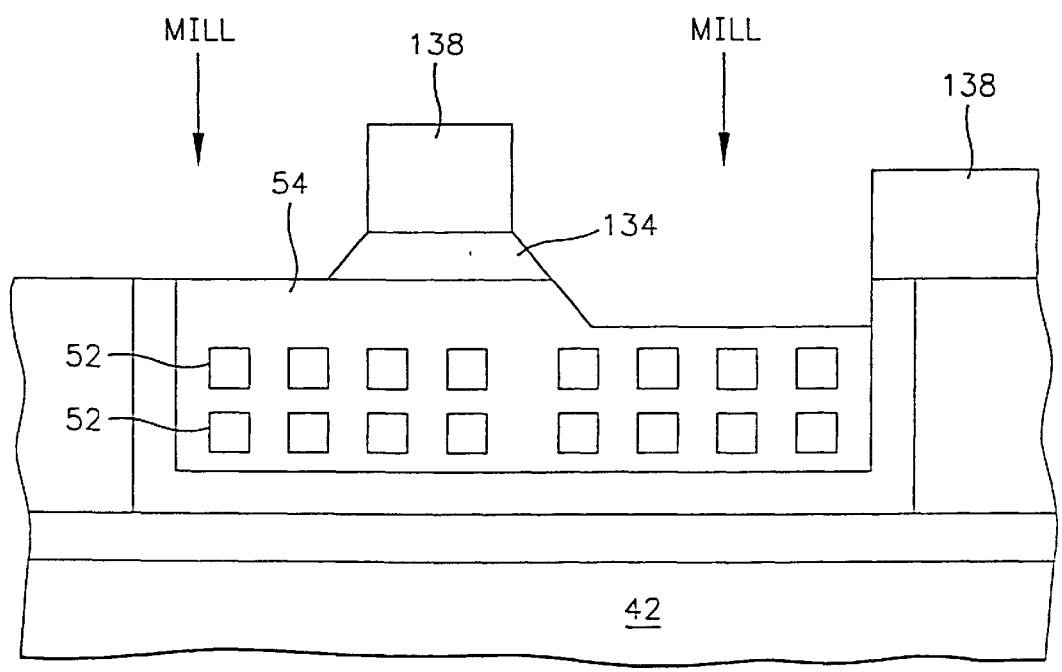
Figure 7D:
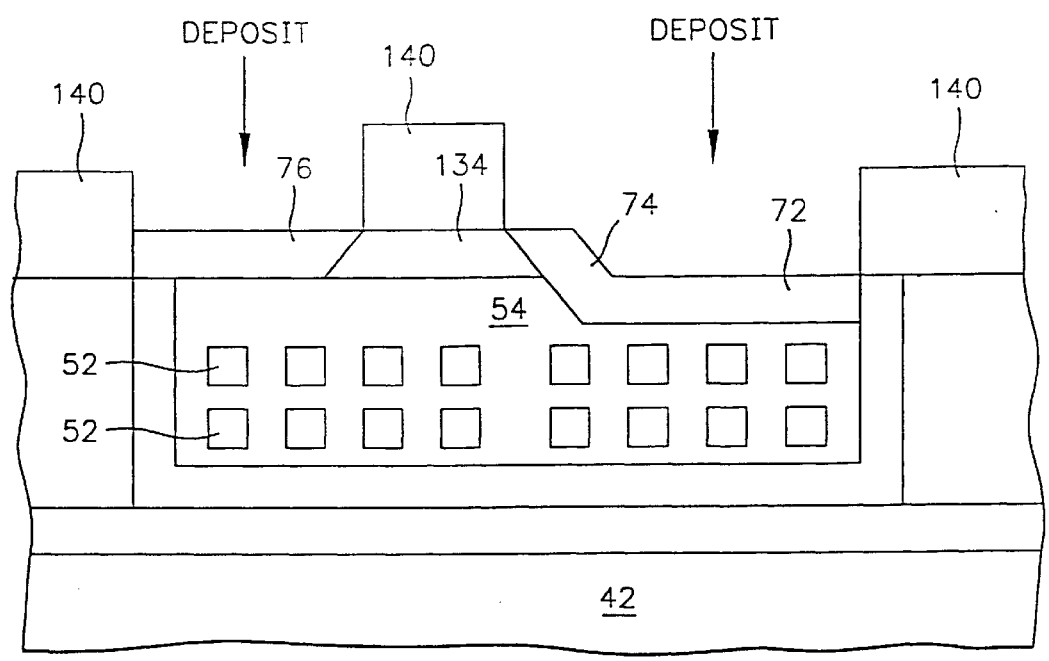
Figure 7E:
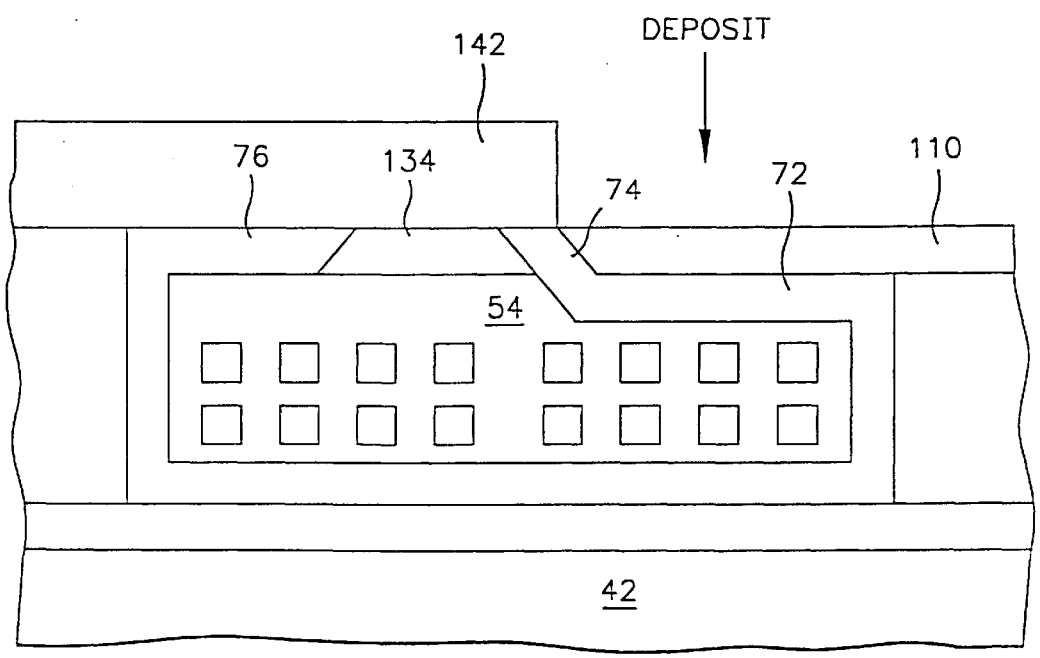

Insulation layers 118, 122, 124 and 128 form the aforementioned insulation stack 54. On top of the insulation stack 54 there is formed an insulation layer 134, such as alumina or SiO$_2$, which extends over the entire wafer 112. As shown in FIG. 7B a resist layer 136 is formed on top of the insulation layer 134 and is patterned to provide an opening so that the insulation layer can be recessed by milling as shown in FIG. 7B. A resist layer 138 is then provided, as shown in FIG. 7C, for recessing the insulation stack on the right side and removing the insulation layer on the left side. As shown in FIG. 7D, a photoresist layer 140 with openings is then provided for the deposition of the recessed horizontal components 72 and the slanted component 74 discussed hereinabove. As shown in FIG. 7E, a photoresist layer 142 is then formed with an opening so that the aforementioned insulation layer 110 can be formed.

Figure 7F:
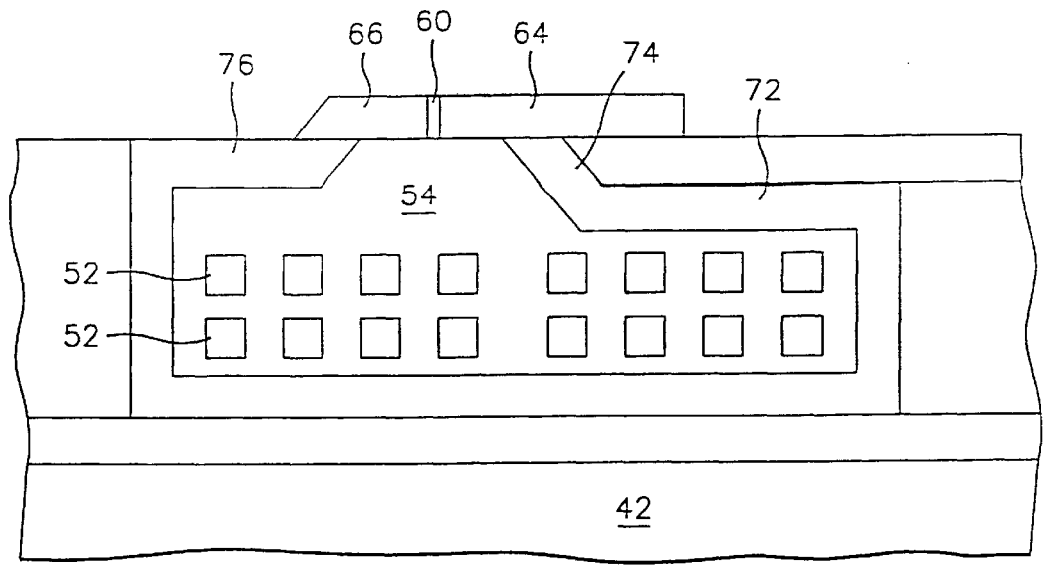

The horizontal components 641 and 66 and the gap 60, shown in FIG. 7F, may be formed by typical photolithography patterning techniques or by side wall technology. If side wall technology is employed a rectangular box of photoresist (not shown) may be formed on the insulation stack 54 immediately to the left of the region where the gap layer 60 is to be formed. Insulative gap material is then deposited on the top of the photoresist box as well as its sides. Milling is then employed to remove the insulative gap material from the top of the box exposing the photoresist so that the photoresist can be removed by developing thereby leaving a rectangular fence of gap material, one side of the fence being located at 60. Photoresist is then employed for patterning and forming the horizontal component 66, after which this photoresist layer can be removed and another photoresist layer is employed after patterning for removing all portions of the insulative gap material except the gap 60. The horizontal component 64 may then be formed by photoresist patterning or side wall technology. Side wall technology formation of vertical components will become more readily understood by the following description.

Figure 8A:
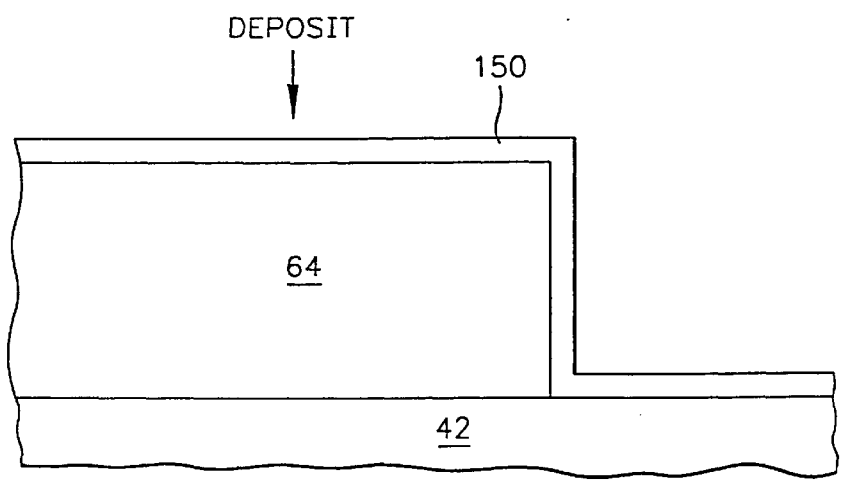
FIGS. 8A–8M are schematic cross-sectional side views of the MR sensor portion of the present horizontal head during various steps of its construction with the exception of FIGS. 8F and 8H which are isometric views illustrating steps during the construction.
Figure 8B:
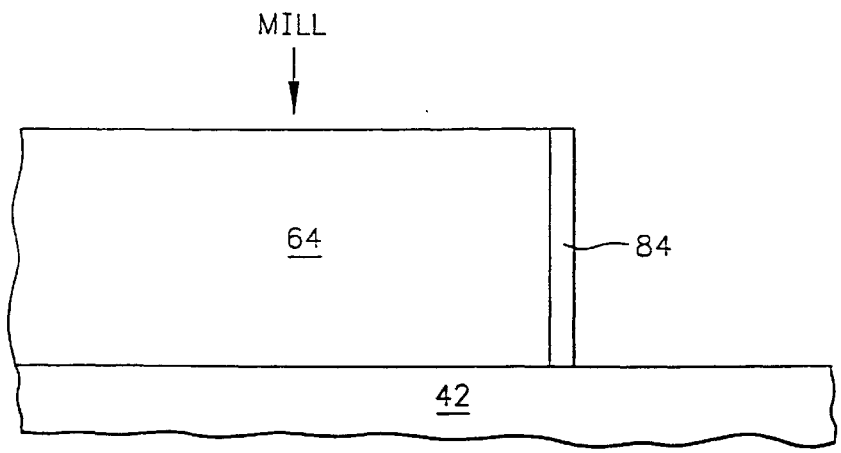

FIGS. 8A–8M show the various steps in the construction of the read element portion of the horizontal head, the read element portion being located at the ABS. FIG. 8A shows the first step in the construction of the read head after the construction of the horizontal component 64 shown in FIG. 7F. An insulative gap layer 150 is formed over the entire wafer including side walls, as shown in FIG. 8A, and then the top portions are removed by any suitable means, such as ion beam milling, leaving the side wall 84 which is the second gap layer of the read head. The formation of the layer 150 may be by plasma vacuum chemical deposition (PVCD) which covers not only top surfaces but also the side walls. This process of covering an entire wafer, including side walls, with a deposition followed by milling of the top surfaces is generally referred to as the aforementioned side wall technology formation of components. It should be understood that these components can be alternatively formed by typical photo-lithography techniques.

Figure 8C:
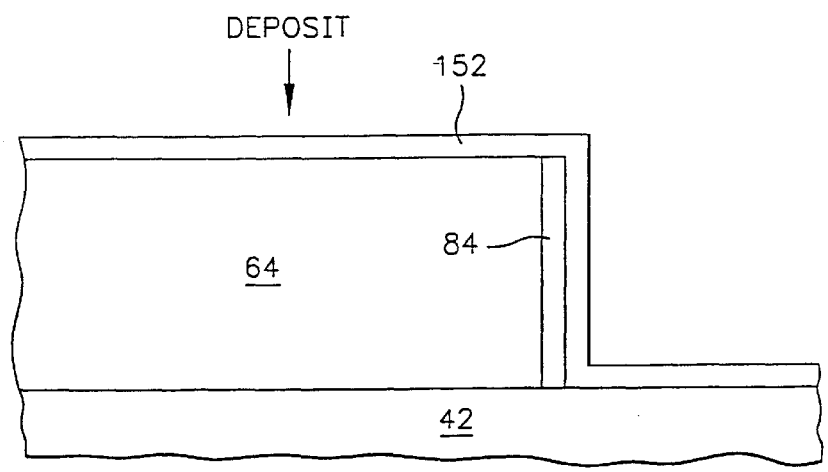
Figure 8D:
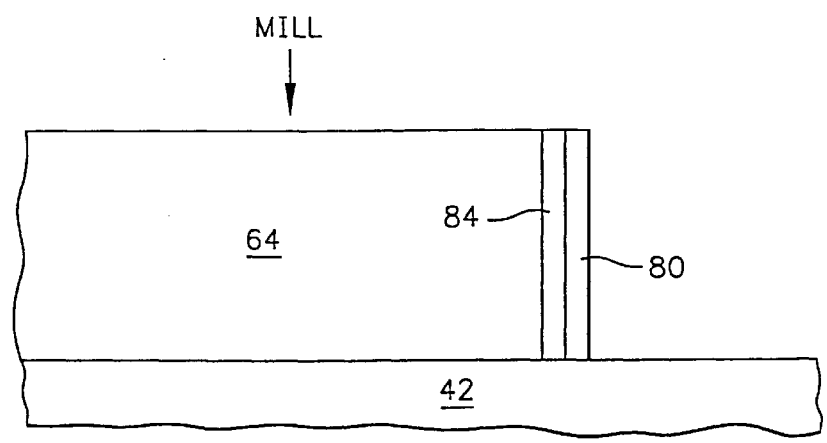
Figure 8E:
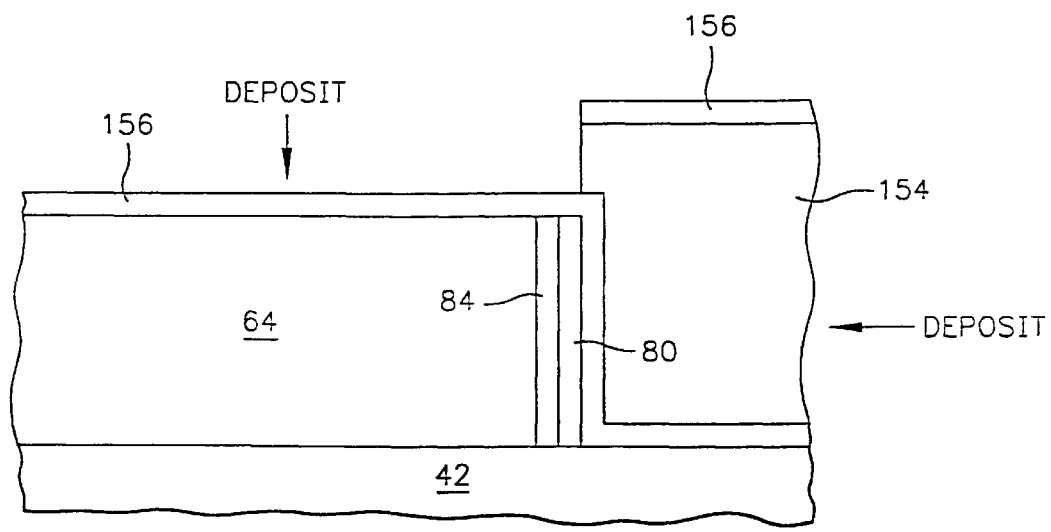
Figure 8F:
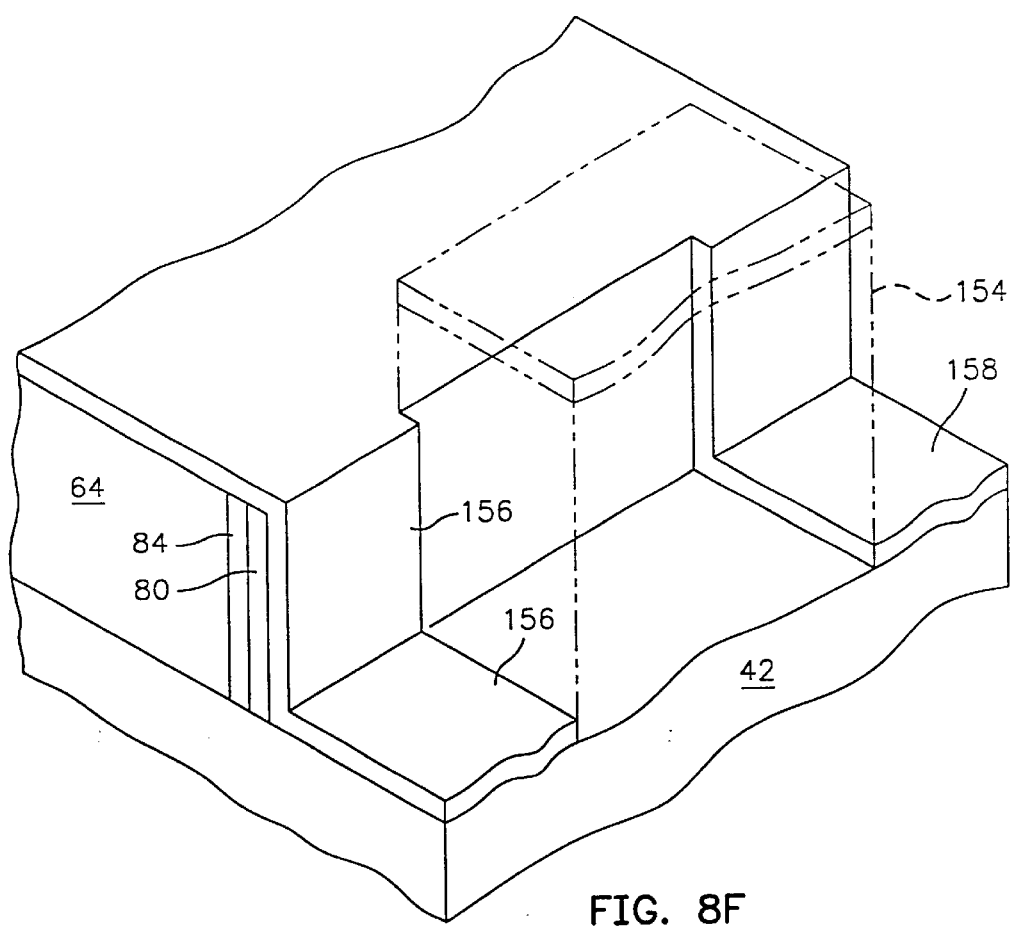
Figure 8G:
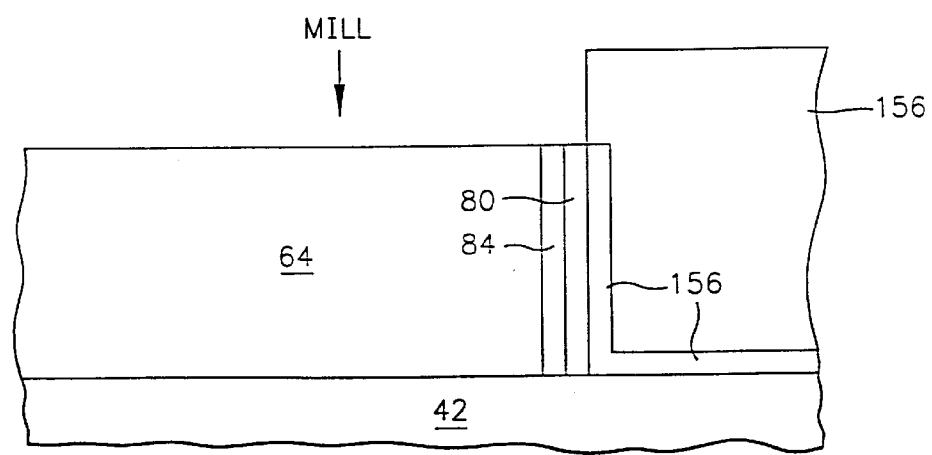
Figure 8H:
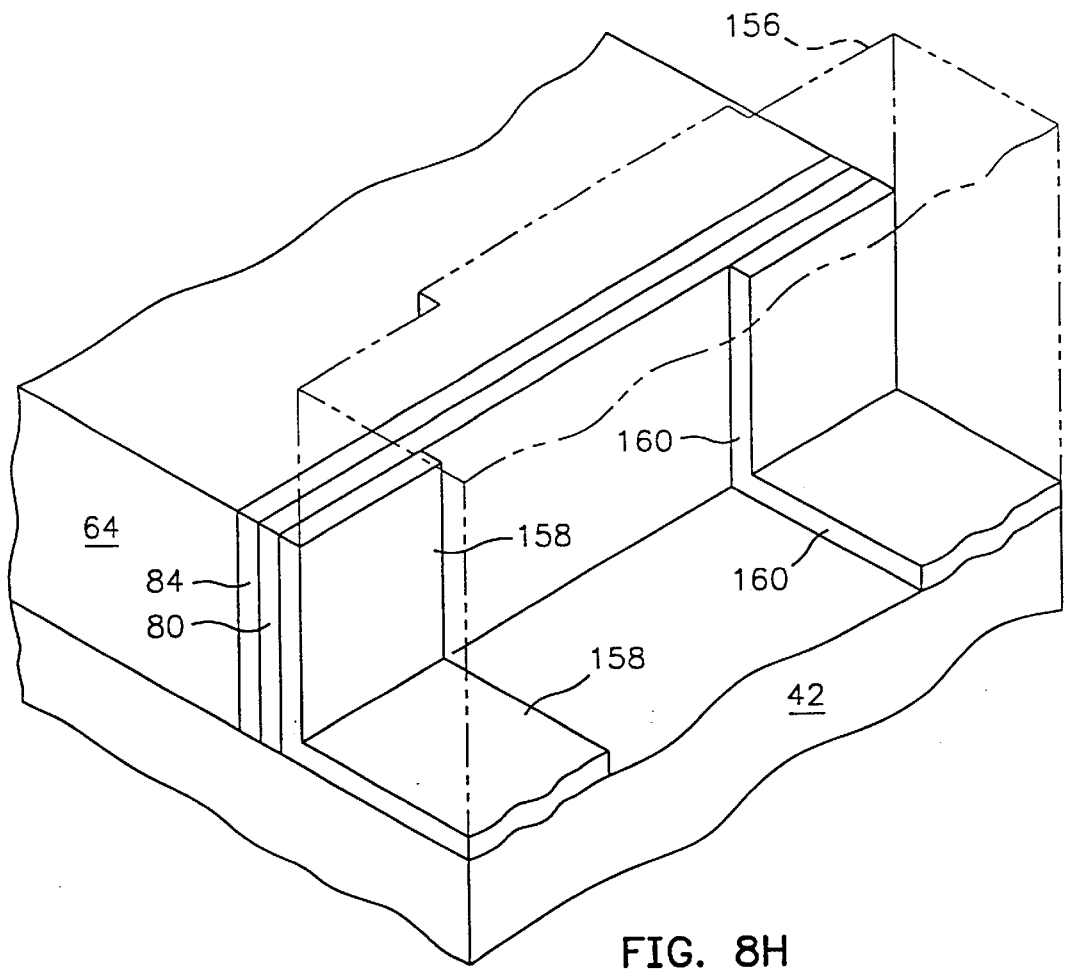
Figure 8I:
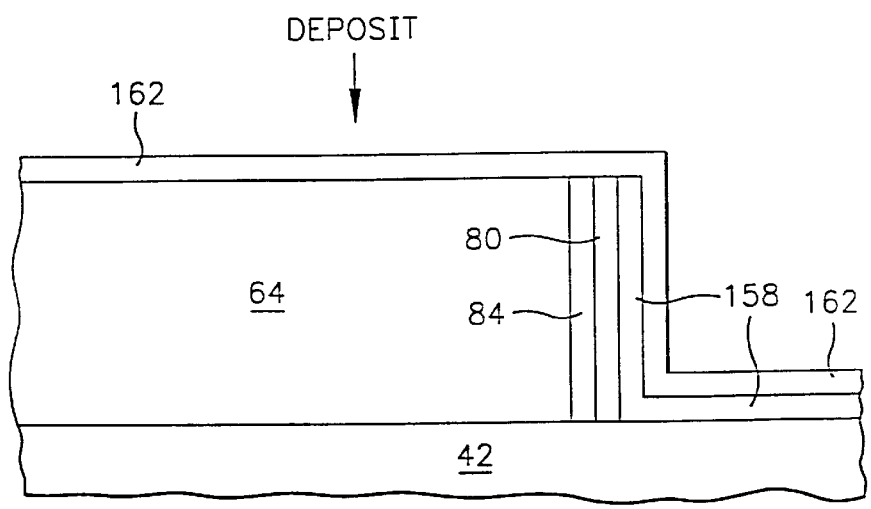
Figure 8J:
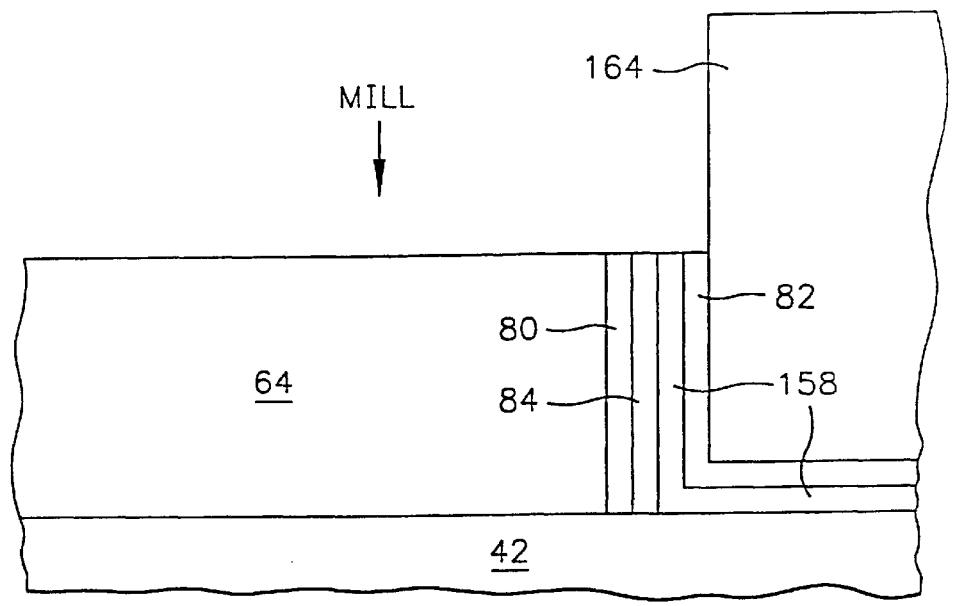
Figure 8K:
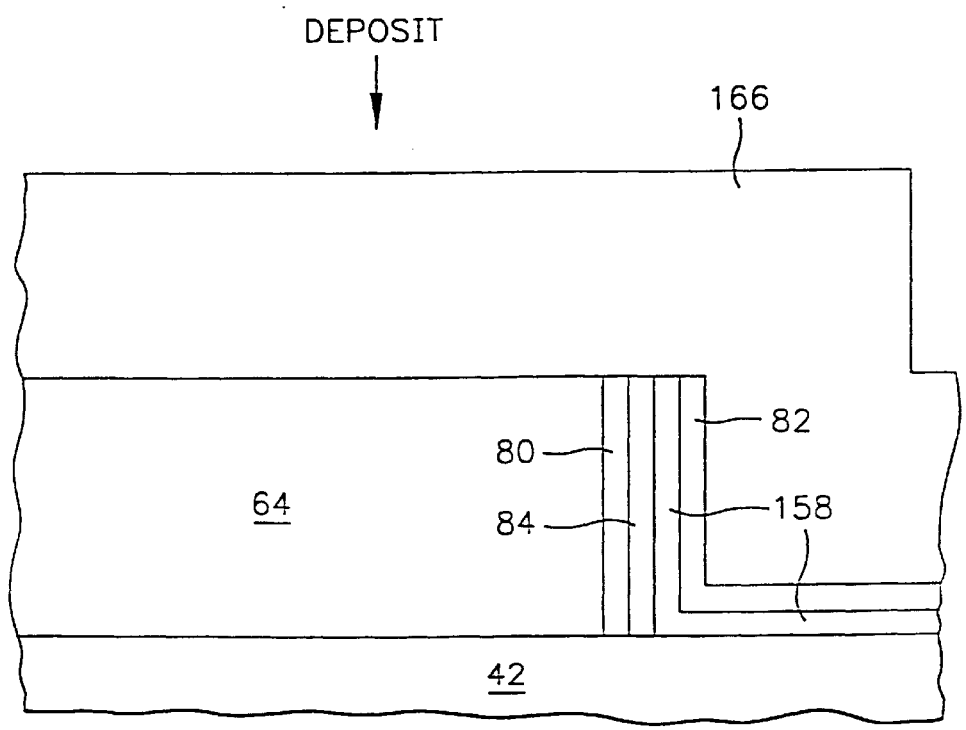
Figure 8L:
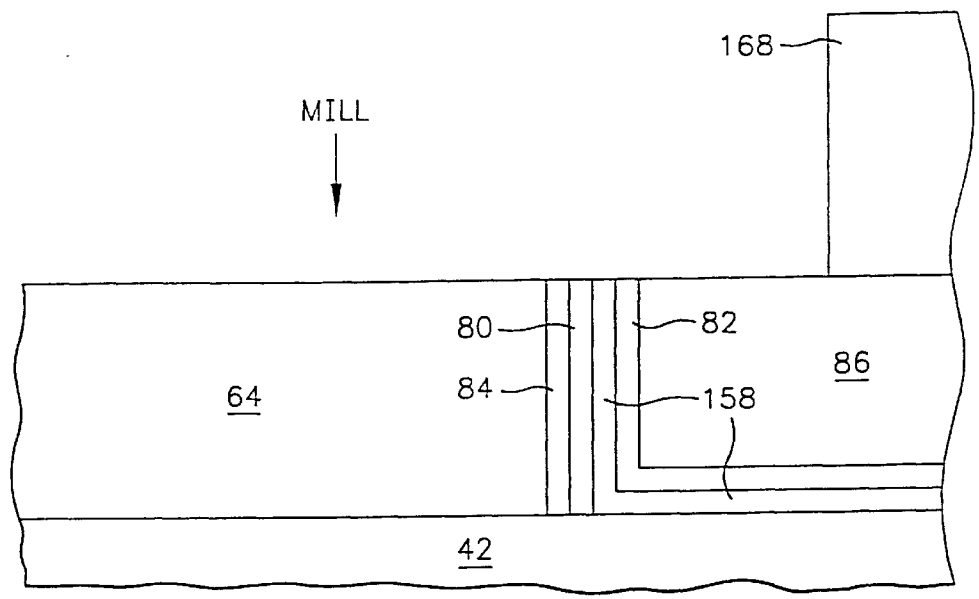
Figure 8M:
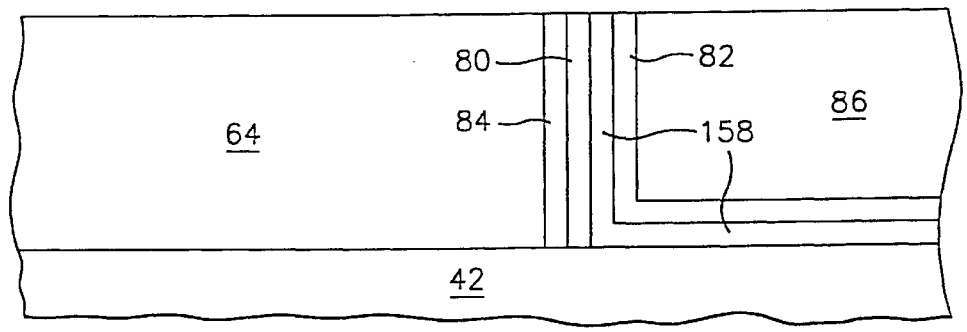

A layer or layers 152 of MR material is then deposited, as shown in FIG. 8C, and the top portions are milled away, as shown in FIG. 8D, to form the MR sensor 80. It should be understood that the MR sensor 80 may be multiple layers of a soft adjacent layer (SAL), an insulation layer, an MR stripe and a capping layer as desired. A photoresist layer 154 is then formed in the active region of the MR sensor, as shown in FIGS. 8E and 8F, and hard biasing and lead layer material 156 may be deposited as shown. The photoresist 154 is then removed and photoresist 157 is placed to protect hard bias and lead material which is to be retained, as shown in FIGS. 8G and 8H, after which the top hard bias and lead material is milled away to leave first and second lead layers 158 and 160. The photoresist layer is then removed and a layer of gap material 162 is formed as shown in FIG. 8I. Photoresist 164 is then placed to protect the gap material to be retained and top portions of the gap material are removed by milling, as shown in FIG. 8J, leaving the first gap 82. The photoresist 164 is then removed and first shield material layer 166 is formed as shown in FIG. 8K. Photoresist 168 is then formed and the top of the second shield material layer is then removed by milling as shown in FIG. 8L. The photoresist layer 168 is then removed leaving the first shield 86, as shown in FIG. 8M. It should be understood that the horizontal component 64 may be formed to present a sloping wall instead of a vertical wall in which instance side wall technology would be employed to construct the layers 84, 80, 158, 82 and 86 with a slope instead of vertically oriented, as shown in FIG. 8M.

Figure 9:
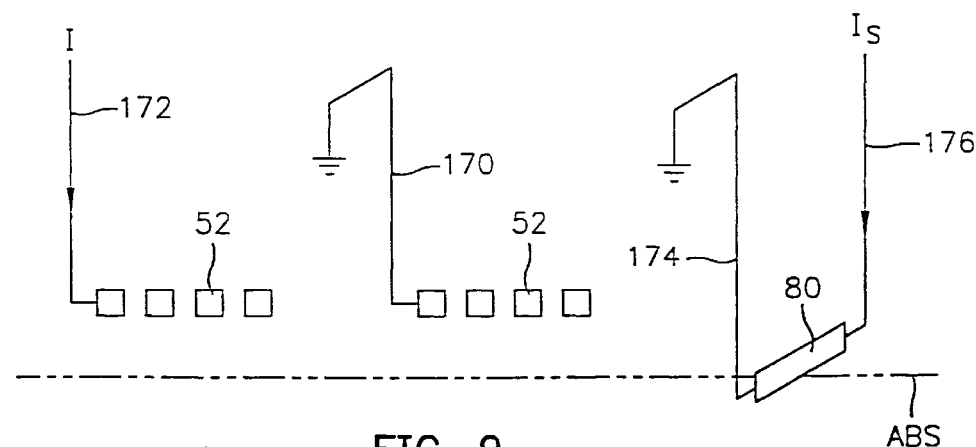
FIG. 9 is a schematic diagram of the conductors for applying currents to the coil layer of the write head and the MR stripe of the single stripe MR sensor embodiment of the present invention.

FIG. 9 is a schematic diagram of the conductors for the write and the read elements of the single stripe MR sensor embodiment of the horizontal head. Conductors 170 and 172 are connected to opposite ends of one or more of the coil layers 52 wherein one of the conductors such as conductor 170 may be grounded and the other conductor 172 may receive a current signal I. Conductors 174 and 176 may be connected to opposite ends of the active region of the single MR stripe of the sensor 80 wherein the conductor 174 may be grounded and the other conductor 176 receives a sense current $I_s$.

Figure 10A:
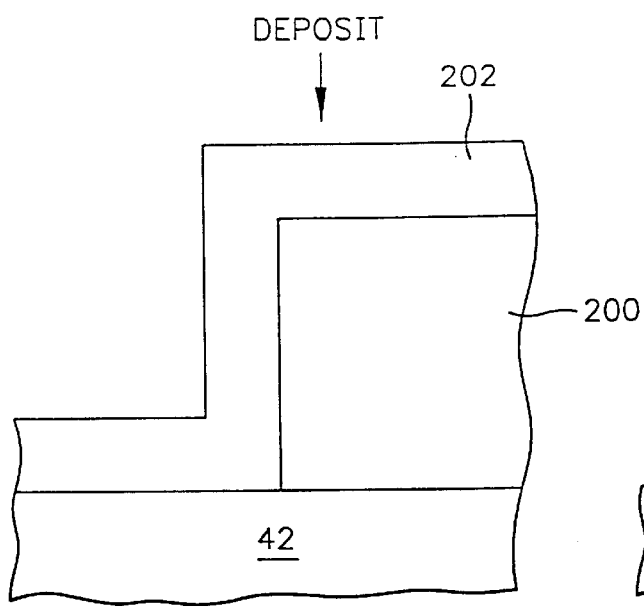
FIGS. 10A–10M are schematic cross-sectional side views of the present dual MR sensor during various steps of its construction.
Figure 10B:
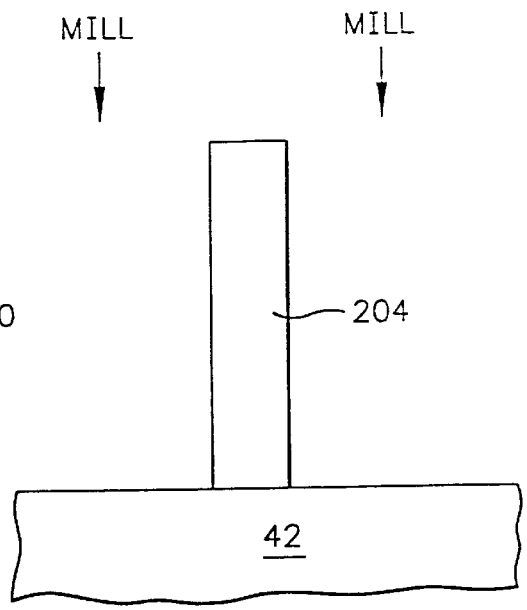
Figure 10C:
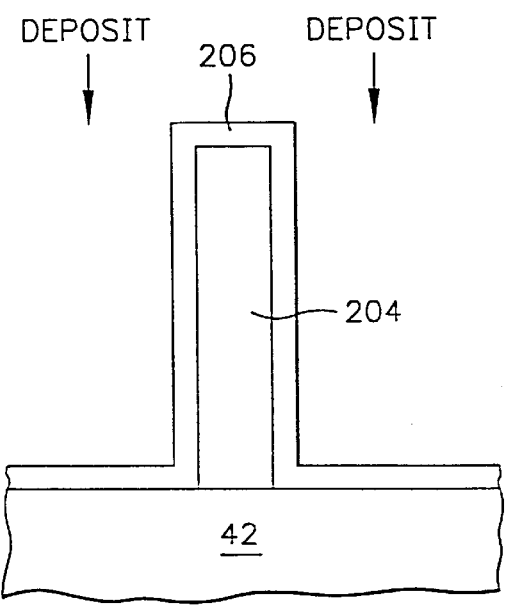
Figure 10D:
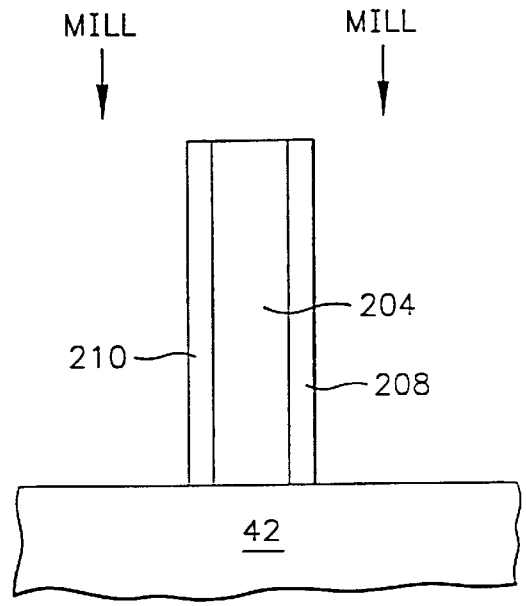

FIGS. 10A–10M describe an alternative embodiment for constructing an MR sensor which has a dual stripe MR sensor which can be substituted for the single stripe MR sensor. In this embodiment the formation of the horizontal component 64, shown in FIG. 7F, will be postponed. The first step in the construction of the dual stripe MR sensor embodiment is to place photoresist 200 for appropriately locating the NR sensor and then forming a layer of spacer material 202. Top portions of the spacer material 202 are then removed by milling and the photoresist 200 is removed leaving a fence of spacer 204 as shown in FIG. 10B. MR material 206 is then deposited on the top and the sides of the spacer 204 after which the top MR material is removed by milling, as shown in FIG. 10D, leaving MR stripes 208 and 210. It should be noted that by this single deposition the MR stripes 208 and; 210 will be nearly identical so that they can implement near absolute common mode rejection.

Figure 10E:
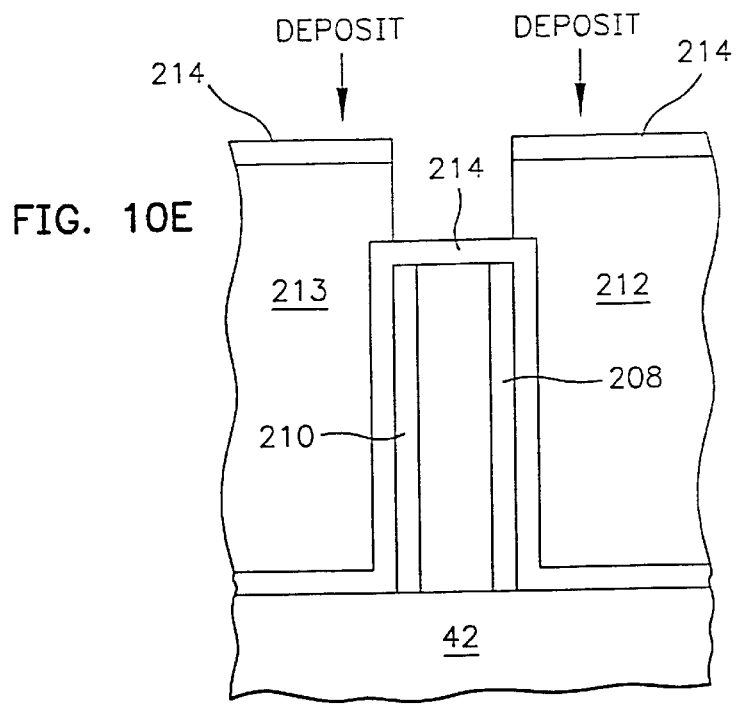
Figure 10F:
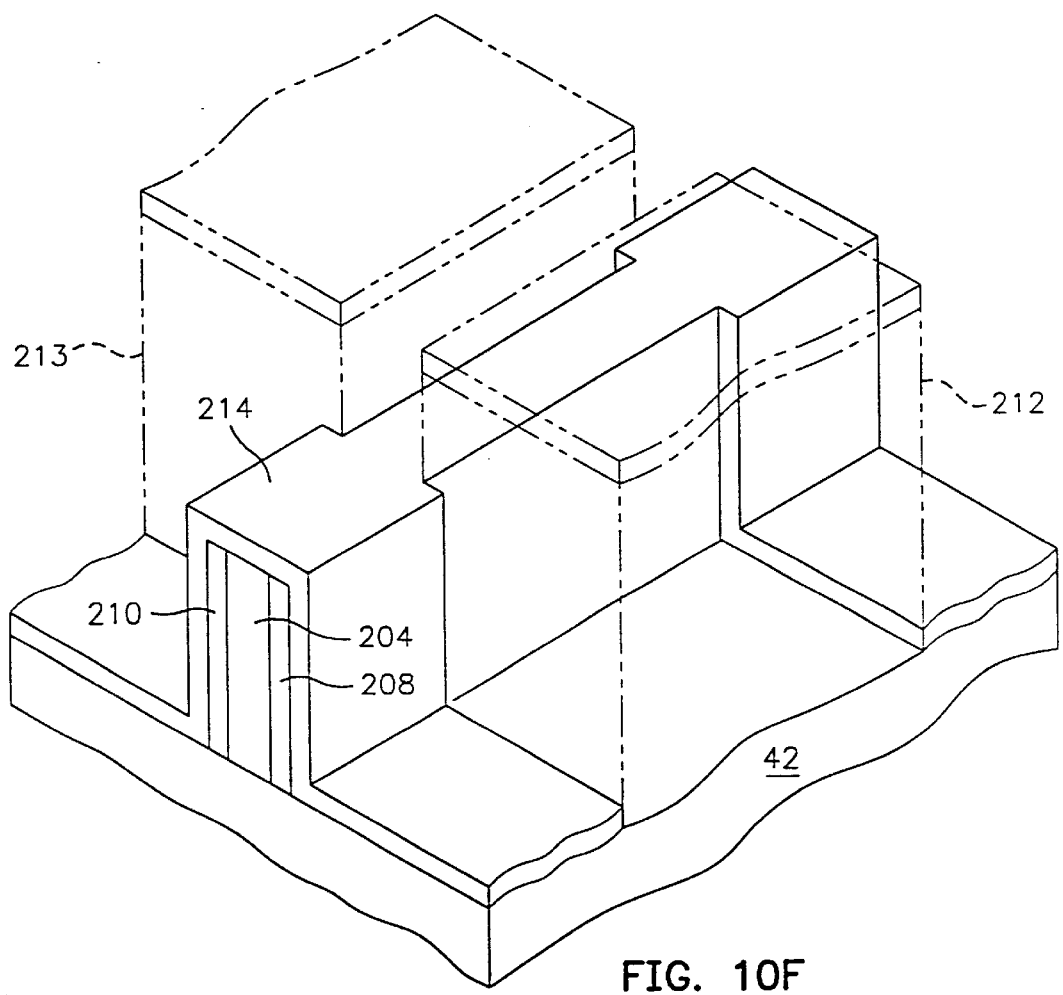
Figure 10G:
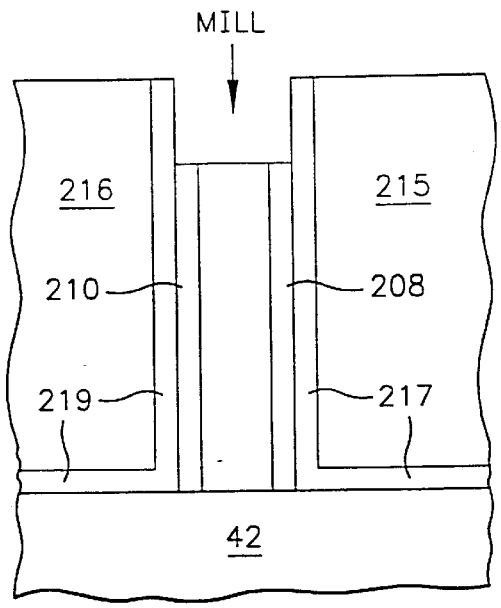
Figure 10H:
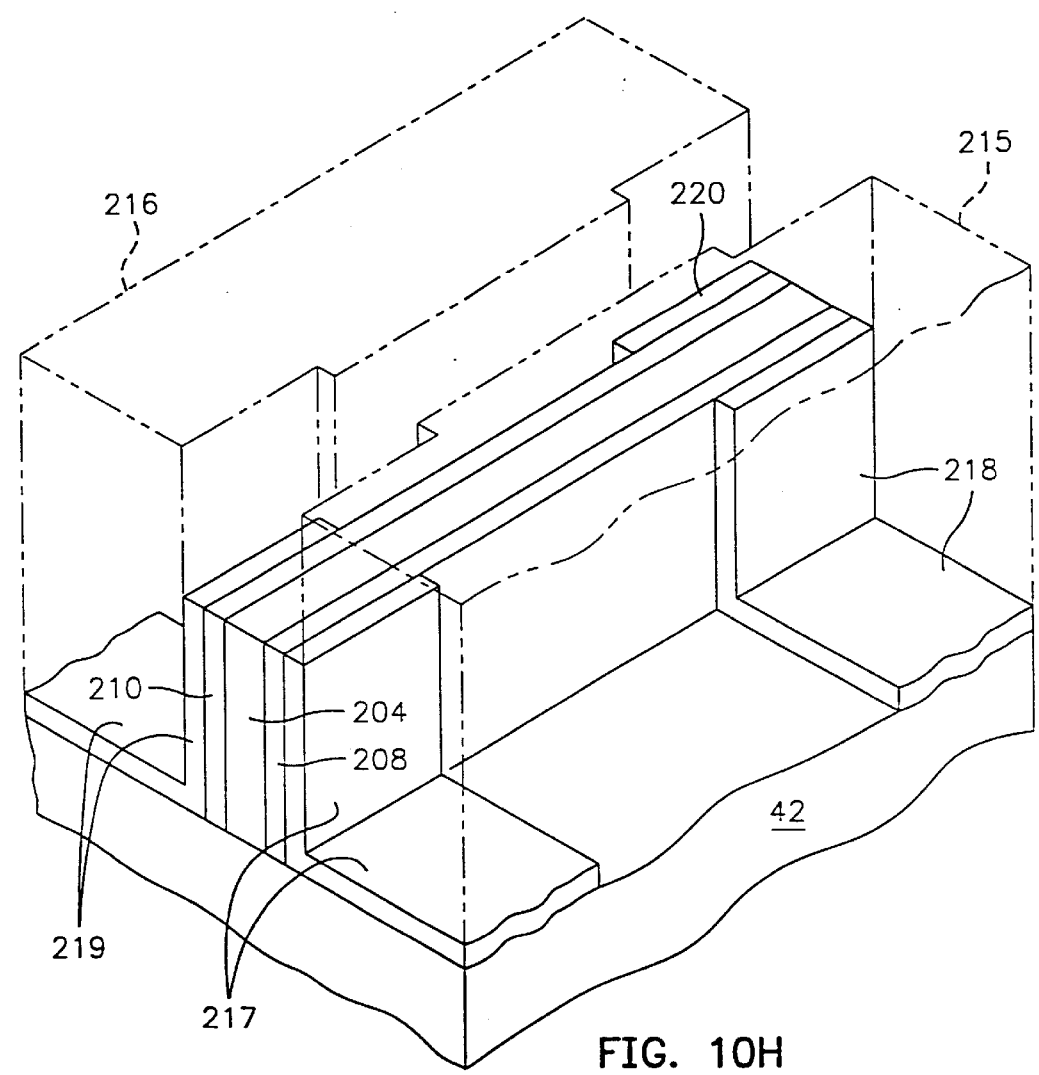
Figure 10I:
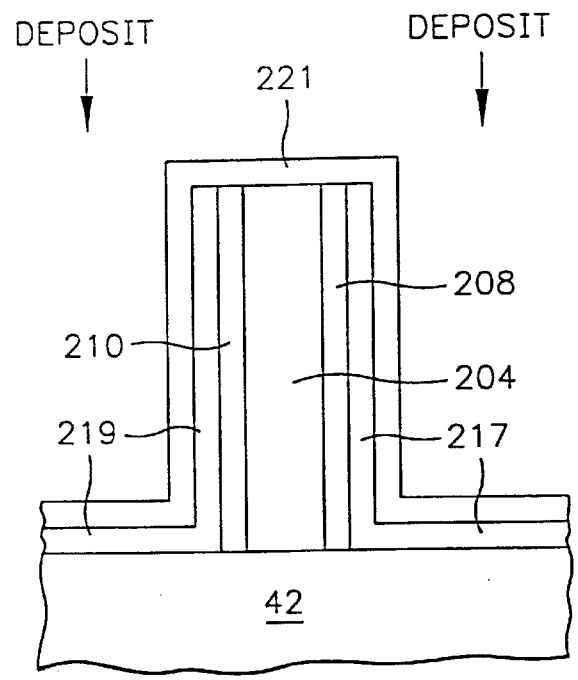
Figure 10J:
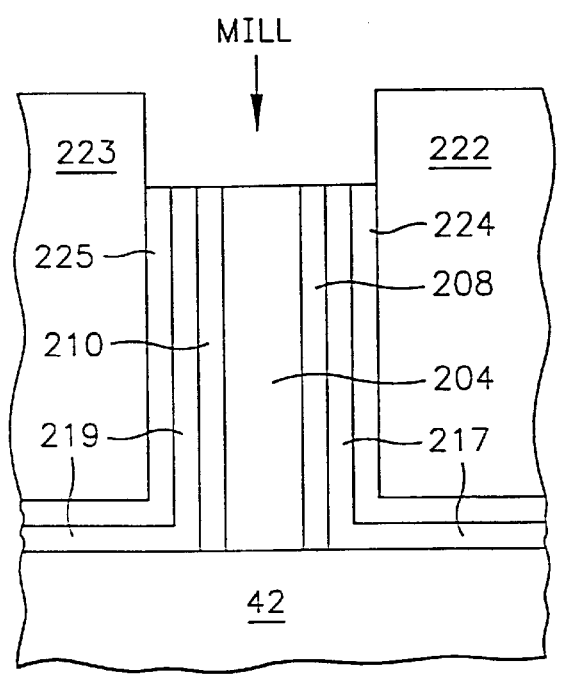
Figure 10K:
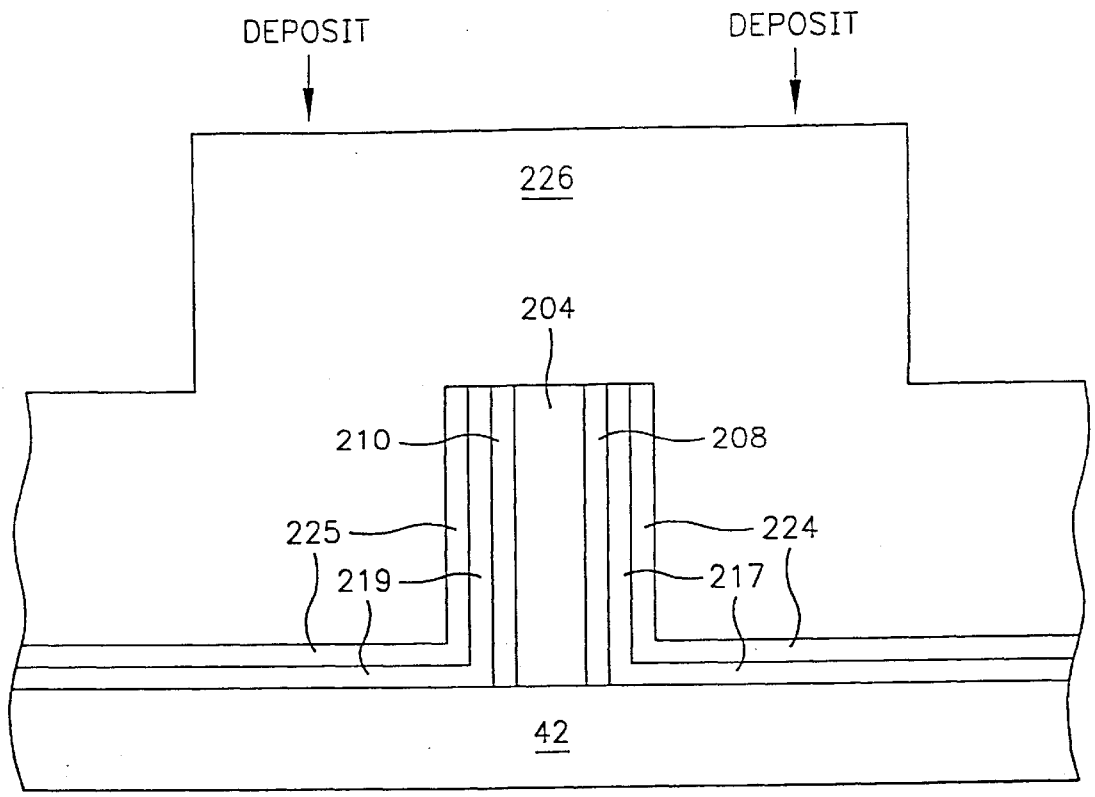
Figure 10L:
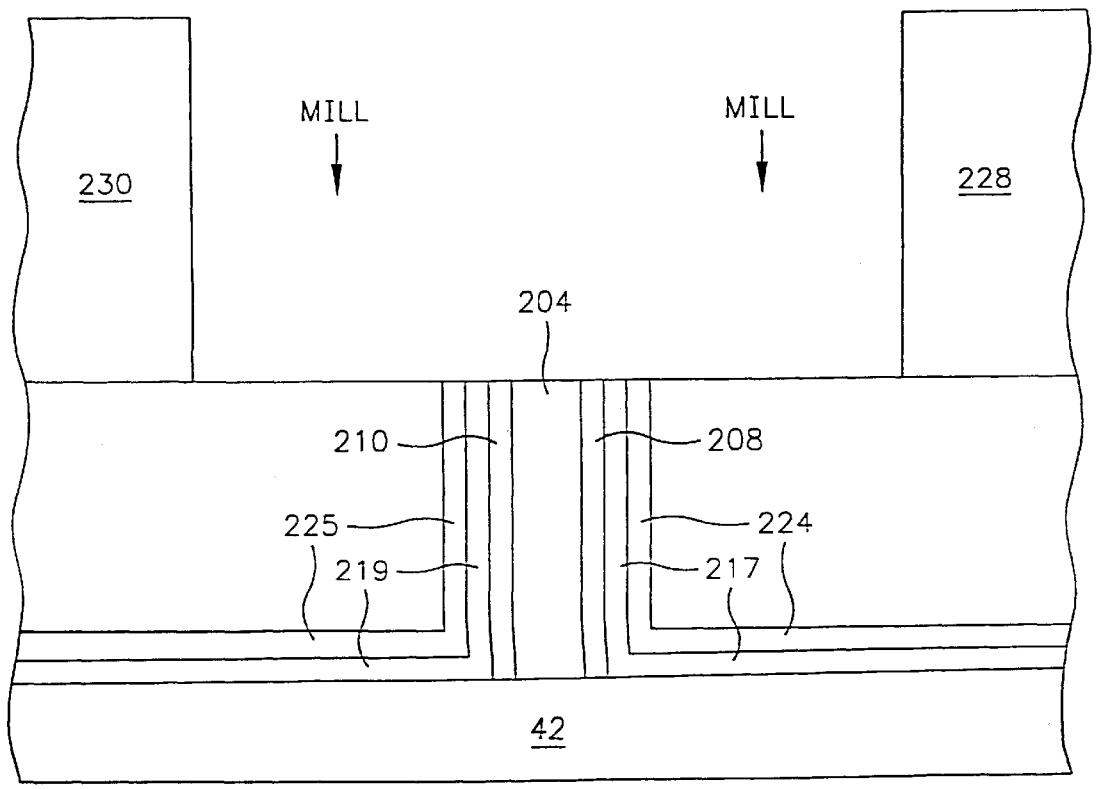
Figure 10M:
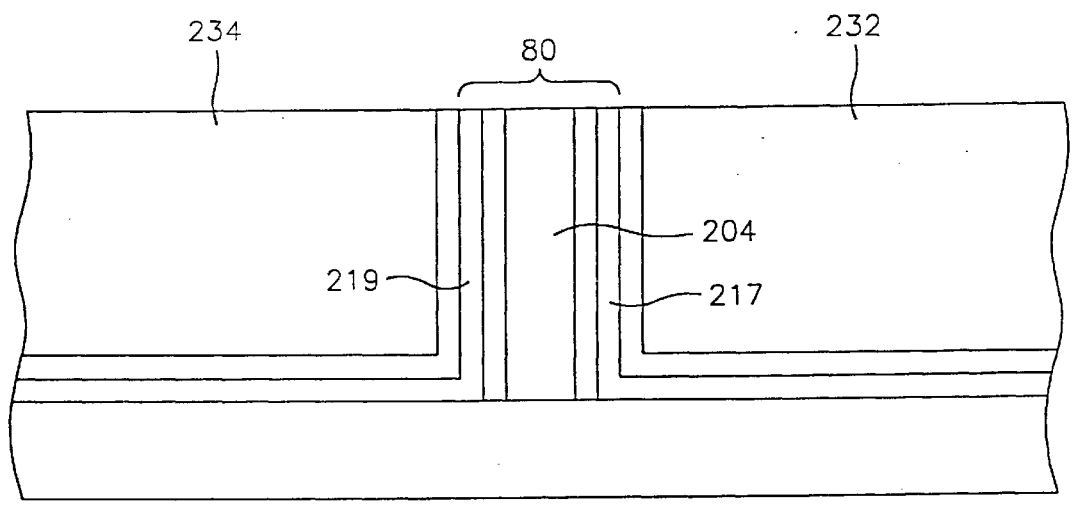

Active regions of the NR stripes 208 and 210 are then protected by photoresist layers 212 and 213, as shown in FIGS. 10E and 10F. Hard bias and lead material 214 is then formed after which the photoresist layers 212 and 213 are removed. Photo-resist layers 215 and 216 are then placed, as shown in FIGS. 10G and 10H, for protecting the hard bias and lead material to be retained and all other hard bias and lead material is milled away leaving hard bias and leads 217, 218, 219 and 220 as shown in FIG. 10G. Second gap material 221 is then deposited over the entire wafer, as shown in FIG. 10I. Photoresist layers 222 and 223 are then placed, as shown in FIG. 10J, for protecting second gap material to be retained and all other gap material is milled away, as shown in FIG. 10J, leaving gap layers 224 and 225. Shield material 226 is then deposited, as shown in FIG. 10K. Photoresist layers 228 and 230 are then formed, as shown in FIG. 10L, to protect shield material to be retained and all other shield material is removed by milling as shown in FIG. 10L. The photoresist layers 228 and 230 are then removed leaving the final MR head structure with a dual stripe and first and second shields 232 and 234, as shown in FIG. 10M. The shield 234 can be a common layer with the horizontal component 64 of the first pole piece as shown in FIG. 5. The structure encompassed by the numeral 80 would be substituted for the single stripe MR sensor 80, shown in FIG. 5, to provide the second embodiment of the invention employing the dual stripe MR sensor.

Figure 11:
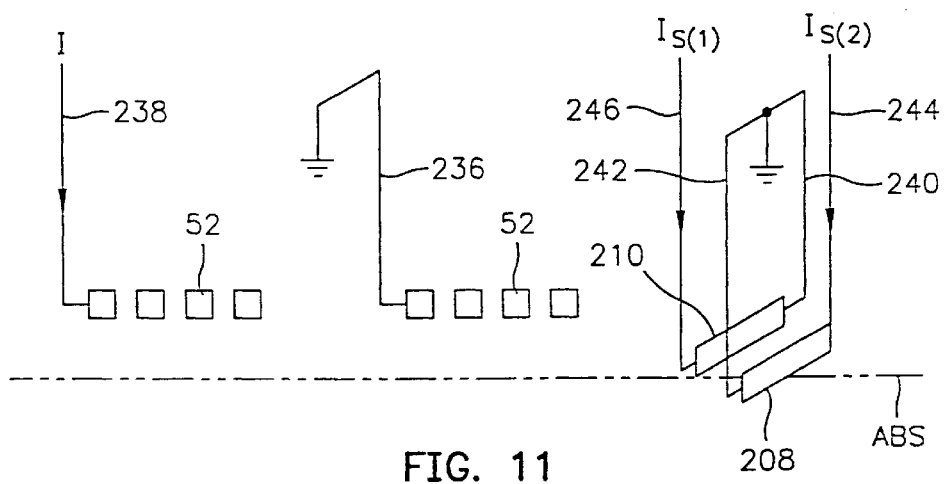
FIG. 11 is a schematic diagram illustrating the conductors for applying currents to the write coil of the write gap and the pair of sensors of the present dual MR sensor.

Conductors for the dual stripe sensor are shown in FIG. 11. Conductors 236 and 238 may be connected to opposite ends of one or more of the lead layers 52 with the conductor 236 connected to ground and the conductor 238 receiving current I. Conductors 240 and 242 may be connected at first ends to respective ends of the MR stripes 208 and 210 and conductors 244 and 246 may be connected at first ends to opposite ends of the MR stripes 208 and 210. Second ends of the conductors 240 and 242 may be connected to ground. A second end of the conductor 244 may receive a first sense current $I_{s1}$ and a second end of the conductor 246 may receive an identical sense current $I_{s2}$. The currents may be conducted through the MR sensors 208 and 210 with opposite polarity or they may be conducted therethrough with the same polarity and then processed by a differential amplifier to implement common mode rejection of noise. The second embodiment of the present invention has the advantages of both aspects of the invention, namely location of the MR sensor at the ABS of a horizontal head and employing near identical MR stripes of a dual MR sensor for near absolute common mode rejection of noise.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of making a horizontal magnetic head having an air bearing surface (ABS), comprising:

forming at least one coil layer and an insulation stack with the coil layer being embedded in the insulation stack;

forming said at least one coil layer with a filament which spirals in a plane which is parallel to said ABS;

forming first and second pole pieces with the insulation stack sandwiched between the first and second pole pieces;

forming the first pole piece with a first horizontal component which is partially bounded by first and second major planar thin film surfaces joined by a first edge with the first major planar thin film surface of the first horizontal component forming a portion of the ABS;

forming the second pole piece with a second horizontal component which is partially bounded by first and second major planar thin film surfaces joined by a second edge with the first major planar thin film surface of the second horizontal component forming a portion of the ABS;

forming a write gap layer between said first and second edges;

forming a first shield layer having first and second major planar thin film surfaces joined by a third edge with the first major planar thin film surface of the first shield layer forming a portion of the ABS;

forming a magnetoresistive (MR) sensor and first and second gap layers with the MR sensor sandwiched between the first and second gap layers and the first and second gap layers located between the third edge and the first horizontal component and with the MR sensor and the first and second gap layers forming portions of the ABS and forming an insulation layer between the MR sensor and the first pole piece.

2. A method of making a horizontal magnetic head having an air bearing surface (ABS), comprising:

forming at least one coil layer and an insulation stack with the coil layer being embedded in the insulation stack;

forming first and second pole pieces with the insulation stack sandwiched between the first and second pole pieces;

forming the first pole piece with a first horizontal component which is partially bounded by first and second major planar thin film surfaces joined by a first edge with the first major planar thin film surface of the first horizontal component forming a portion of the ABS;

forming the first pole piece with a first recessed horizontal component which is recessed from and extends parallel to the ABS;

forming the first pole piece with a slanted component which extends at an angle to the ABS and joins the first recessed horizontal component and the first horizontal component; and forming the second pole piece with a second horizontal component which is partially bounded by first and second major planar thin film surfaces joined by a second edge with the first major planar thin film surface of the second horizontal component forming a portion of the ABS;

forming a write gap layer between said first and second edges;

forming a first shield layer having first and second major planar thin film surfaces joined by a third edge with the first major planar thin film surface of the first shield layer forming a portion of the ABS; and forming a magnetoresistive (MR) sensor and first and second gap layers with the MR sensor sandwiched between the first and second gap layers and the first and second gap layers located between the third edge and the first horizontal component and with the MR sensor and the first and second gap layers forming portions of the ABS;

forming an insulation layer between the MR sensor, the first and second gap layer, the first shield layer, the first horizonal component and the first recessed horizontal component so as to separate the MR sensor, the first and second gap layers, the first shield layer and the first horizontal component from the first recessed horizontal component; and forming the MR sensor with only one elongated MR stripe which has a longitudinal axis with the longitudinal axis extending perpendicular to said ABS.

3. A method as claimed in claim 2 comprising:

forming the MR sensor with an active region wherein the active region has a width which defines a read track width;

forming each of the first and second horizontal components with a width at said write gap layer which defines a write track width; and aligning the widths of the active region and the first and second horizontal components.

4. A method as claimed in claim 3 comprising:

said forming of the first horizontal component forming the first horizontal component with a fourth edge which interfaces the second gap layer so that the first horizontal component serves as a second shield layer for the MR sensor;

forming the second pole piece with a second recessed horizontal component which is recessed from and extends parallel to the ABS; and joining the second horizontal component to the second recessed horizontal component with the second major planar thin film surface of the second horizontal component overlapping and interfacing the first major planar thin film surface of the second recessed horizontal component.

5. A method of making a horizontal magnetic head having an air bearing surface (ABS), comprising:

forming at least one coil layer and an insulation stack with the coil layer being embedded in the insulation stack;

forming said at least one coil layer with a filament which spirals in a plane which is parallel to said ABS;

forming first and second pole pieces with the insulation stack sandwiched between the first and second pole pieces, forming the first pole piece with a first horizontal component which is partially bounded by first and second major planar thin film surfaces joined by a first edge with the first major planar thin film surface of the first horizontal component forming a portion of the ABS;

forming the second pole piece with a second horizontal component which is partially bounded by first and second major planar thin film surfaces joined by a second edge with the first major planar thin film surface of the second horizontal component forming a portion of the ABS;

forming a write gap layer between said first and second edges;

forming a first shield layer having first and second major planar thin film surfaces joined by a third edge with the first major planar thin film surface of the first shield layer forming a portion of the ABS;

forming a magnetoresistive (MR) sensor and first and second gap layers with the MR sensor sandwiched between the first and second gap layers and the first and second gap layers located between the third edge and the first horizontal component and with the MR sensor and the first and second gap layers forming portions of the ABS;

forming the MR sensor with first and second MR stripes which are spaced apart by a spacer layer;

forming each MR stripe with a longitudinal axis which extends perpendicular to the ABS; and forming the first and second MR stripes between the first and second gap layers.

6. A method as claimed in claim 5 comprising:

forming the first pole piece with a first recessed horizontal component which is recessed from and extends parallel to the ABS;

forming the first pole piece with a slanted component which extends at an angle to the ABS and joins the first recessed horizontal component and the first horizontal component; and forming an insulation layer between the MR sensor, the first and second gap layer, the first shield layer, the first horizonal component and the first recessed horizontal component so as to separate the MR sensor, the first and second gap layers, the first shield layer and the first horizontal component from the first recessed horizontal component.

7. A method as claimed in claim 6 comprising:

forming the MR sensor with an active region wherein the active region has a width which defines a read track width;

forming each of the first and second horizontal components with a width at said write gap layer which defines a write track width; and aligning the widths of the active region and the first and second horizontal components.

8. A method as claimed in claim 7 comprising:

said forming of the first horizontal component forming the first horizontal component with a fourth edge which interfaces the second gap layer so that the first horizontal component serves as a second shield layer for the MR sensor;

forming the second pole piece with a recessed horizontal component which is recessed from and extends parallel to the ABS; and joining the second horizontal component to the second recessed horizontal component with the second major planar thin film surface of the second horizontal component overlapping and interfacing the first major planar thin film surface of the second recessed horizontal component.

9. A method of making a horizontal magnetic head having an air bearing surface (ABS), comprising:

forming at least one coil layer and an insulation stack with the coil layer being embedded in the insulation stack;

forming said at least one coil layer with a filament which spirals in a plane which is parallel to said ABS;

forming first and second pole pieces with the insulation stack sandwiched between the first and second pole pieces;

forming the first pole piece with a first horizontal component which is partially bounded by first and second major planar thin film surfaces joined by a first edge with the first major planar thin film surface of the first horizontal component forming a portion of the ABS;

forming each of the first and second major planar thin film surfaces of the first horizontal component with a larger surface area than a surface area of said first edge;

forming the second pole piece with a second horizontal component which is partially bounded by first and second major planar thin film surfaces joined by a second edge with the first major planar thin film surface of the second horizontal component forming a portion of the ABS;

forming each of the first and second major thin film surfaces of the second horizontal component with a larger surface area than a surface area of said second edge;

forming a write gap layer between said first and second edges;

forming a first shield layer having first and second major planar thin film surfaces joined by a third edge with the first major planar thin film surface of the first shield layer forming a portion of the ABS;

forming each of the first and second major planar thin film surfaces of the first shield layer with a surface area which is greater than a surface area of said third edge; and forming a magnetoresistive (MR) sensor and first and second gap layers with the MR sensor sandwiched between the first and second gap layers and the first and second gap layers located between the third edge and the first horizontal component and with the MR sensor and the first and second gap layers forming portions of the ABS.

10. A method as claimed in claim 9 comprising:

forming an insulation layer between the MR sensor and the first pole piece.

11. A method as claimed in claim 9 comprising:

said forming of the first horizontal component forming the first horizontal component with a fourth edge which interfaces the second gap layer so that the first horizontal component serves as a second shield layer for the MR sensor.

12. A method as claimed in claim 9 comprising:

forming the MR sensor with an active region wherein the active region has a width which defines a read track width;

forming each of the first and second horizontal components with a width at said write gap layer which defines a write track width; and aligning the widths of the active region and the first and second horizontal components.

13. A method as claimed in claim 9 comprising:

forming the MR sensor with only one elongated MR stripe which has a longitudinal axis with the longitudinal axis extending perpendicular to said ABS.

* * * * *